United States Patent [19]

Hitomi et al.

[11] Patent Number: 5,421,296
[45] Date of Patent: Jun. 6, 1995

[54] ENGINE INTAKE APPARATUS

[75] Inventors: Mitsuo Hitomi; Junsou Sasaki, both of Hiroshima, Japan

[73] Assignee: Mazda Motor Corporation, Hiroshima, Japan

[21] Appl. No.: 124,473

[22] Filed: Sep. 22, 1993

[30] Foreign Application Priority Data

Sep. 28, 1992 [JP] Japan .................. 4-258120

[51] Int. Cl.$^6$ ............................................ F02B 75/18
[52] U.S. Cl. ........................... 123/184.53; 123/90.17; 123/559.1; 123/184.31
[58] Field of Search ............ 123/184.21, 184.31, 123/184.53, 90.15, 90.17, 559.1

[56] References Cited

U.S. PATENT DOCUMENTS 4,530,318  7/1985  Semple ..................... 123/90.17
5,125,369  6/1992  Hitomi et al. ............. 123/52 M

FOREIGN PATENT DOCUMENTS 2-119641  5/1990  Japan .

*Primary Examiner*—Noah P. Kamen
*Attorney, Agent, or Firm*—Fish & Richardson

[57] ABSTRACT

An engine intake apparatus includes a mechanical supercharger: a plurality of engine cylinders, each of the engine cylinders communicating with an intake air passage through an intake valve and an exhaust gas passage through an exhaust valve; and a variable valve timing mechanism for varying a valve overlap period between the intake and exhaust valves. The variable valve timing mechanism widens the valve overlap period in a predetermined high engine speed region and narrows the valve overlap period in predetermined low engine speed region. When the valve overlap is large, an inertia supercharging effect is generated so that a negative-pressure wave caused during an engine intake stroke propagates in the independent intake air passage from the engine cylinder to an upstream part thereof, in turn, is reflected at a volumetrically enlarged portion and, then, becomes a positive-pressure wave and returns to the engine cylinder. On the other hand, when the valve overlap is small, a resonance supercharging effect is generated so that the engine cylinders belonging to the same group are not contiguous with each other in their intake orders for causing a resonance supercharging effect.

12 Claims, 4 Drawing Sheets

ENGINE INTAKE APPARATUS

BACKGROUND OF THE INVENTION

The present invention relates to an engine intake apparatus wherein the valve timing between intake and exhaust valves is variable in accordance with an engine speed.

There has been conventionally proposed various engine intake systems equipped with a variable valve timing mechanism capable of varying the valve timing between intake and exhaust valves. The mutual relationship between intake and exhaust valves is normally defined or represented in terms of a valve overlap. The valve overlap is generally defined by a specific crank angle during which the intake and exhaust valves open simultaneously. In an engine transition period from the exhaust stroke to the intake stroke, the exhaust valve normally comes to close while the intake valve comes to open. In this transition period, both the intake and exhaust valves are opened simultaneously during a predetermined crank angle. This period is referred to as a valve overlap.

The valve overlap is generally controlled to be large or small to optimize various engine performances such as scavenging efficiency, charging efficiency, combustion stability in accordance with an engine operational condition.

For example, in an engine equipped with a supercharger disclosed in Unexamined Japanese Patent Publication No. 2-119641, there is disclosed a typical variable valve timing mechanism. More specifically, a valve overlap is usually widened in an engine high load condition, so that residual exhaust gas can be sufficiently scavenged by high pressure of supercharged intake air during this relatively long overlap period. On the other hand, the valve overlap is narrowed in an engine low load condition, so that stability of combustion is ensured.

It is also known that widening the valve overlap in accordance with am increase of the engine speed is effective to more precisely optimize the scavenging performance.

Meanwhile, as a means for increasing intake air charge amount, there has been conventionally known a dynamic supercharging system utilizing inertia or resonance effect. This dynamic supercharging system basically varies an effective length of intake air passage in accordance with an engine speed so as to cause a dynamic supercharging effect in a wide engine speed range. If such a dynamic supercharging system is incorporated into an engine equipped with a mechanical supercharger, a load of the mechanical supercharger is fairly reduced and therefore an overall engine torque will be largely increased. It is needless to say that, even if this dynamic supercharging system is incorporated into a normal aspiration engine, an engine torque will be also increased.

This kind of dynamic supercharging system basically utilizes a pressure wave propagating in the intake air passage. More specially, in order to increase intake air charge amount, it is essential to supply a high positive-pressure wave to the engine cylinder at the terminal end of its intake stroke. In other words, the conventional dynamic supercharging system mainly pays attention to how a high positive-pressure is caused at the final stage of the intake stroke.

However, the inventors of this application found that the pressure condition during the valve overlap period significantly affects engine performance if such a dynamic supercharging system is united with the variable valve timing mechanism.

In case of inertia supercharging arrangement, a negative-pressure wave is caused due to suction motion of an engine piston during an intake stroke of an engine. This negative-pressure wave propagates in the intake air passage from the engine cylinder to an upstream part thereof. Then, this negative-pressure wave is reflected at an opened end (i.e. a volumetrically enlarged portion) of the intake air passage. The reflected wave becomes a positive-pressure wave and returns to the engine cylinder. Namely, the positive-pressure wave is finally supplied to the engine cylinder at the terminal stage of the intake stroke.

Concerning the pressure condition through this inertia supercharging behavior, there is caused a small pressure variation during the valve overlap period because substantially no large change is generated in the very beginning of the intake stroke, although the negative pressure is soon generated by the suction motion of the engine piston after this overlap period.

On the contrary, in case of resonance supercharging arrangement, a plurality of engine cylinders are divided into two groups so that engine cylinders belonging to the same group are not contiguous with each other in their intake orders. For this arrangement, cylinders belonging to the same group cooperate to cause a stable pressure oscillation in the intake air passage due to cyclically repeated intake motions of respective cylinders in the same group. In this case, a relatively large positive-pressure meets the valve overlap period of each cylinder because of a resonance wave stably residing in the intake air passage. Accordingly, the intake air pressure condition is very different between the inertial and resonance supercharging conditions.

Hence, it will be a key point in further improving the engine performance to manage both the length of the valve overlap period and the intake air pressure condition during the valve overlap period.

SUMMARY OF THE INVENTION

The present invention has an object, in view of the above-described problems, to provide an engine intake apparatus which effectively utilizes dynamic supercharging effect as well as varies the valve overlap in accordance with the engine speed, thereby improving an engine scavenging performance and increasing an engine output torque.

Accordingly, the present invention provides an engine intake apparatus comprising: a plurality of engine cylinders, each of the engine cylinders communicating with an intake air passage through an intake valve and an exhaust gas passage through an exhaust valve; variable valve timing means for varying a valve overlap period between the intake and exhaust valves in accordance with an engine speed; an inertia supercharging arrangement in which a negative-pressure wave caused during an engine intake stroke propagates in the intake air passage from the engine cylinder to an upstream part thereof, in turn, is reflected at a volumetrically enlarged portion of the intake air passage and, then, becomes a positive-pressure wave and returns to the engine cylinder; a resonance supercharging arrangement in which the engine cylinders are divided into two groups so that engine cylinders belonging to the same group are not contiguous with each other in their intake orders; and control means for effecting the inertia supercharging arrangement to generate an inertia supercharging effect in a relatively low engine speed region when the variable valve timing means widens the valve overlap period and for effecting the resonance supercharging arrangement to generate a resonance supercharging effect when the variable valve timing means narrows the valve overlap period.

With the arrangement of the present invention, not only the valve overlap period is changeable in accordance with an engine speed but intake air charging amount is increased by the dynamic supercharging effect. Especially resonance supercharging effect is utilized in a region where the valve overlap is small, thereby increasing intake air pressure. Therefore, scavenging performance is adequately maintained even if the valve overlap period is small.

On the other hand, inertia supercharging effect is utilized in a relatively low speed region within the predetermined engine speed region wherein the valve overlap period is widened, thereby preventing the intake air pressure from excessively increasing so that no mixture of fresh air and fuel directly passes through the engine cylinder and intake air charge amount can be increased.

More specifically, it is preferable that the variable valve timing means widens the valve overlap period in predetermined high engine speed region while narrowing the valve overlap period in a predetermined low engine speed region.

Also, a mechanical supercharger may be provided on the engine intake apparatus.

Further, it is preferable that the variable valve timing means delays the close timing of the intake valve by a predetermined time to reduce the effective compression ratio of the cylinder.

Still further, it is preferable that the variable valve timing means changes a phase of a valve lift curve of the intake valve so as to delay the close timing of the intake valve by a predetermined time and realize a small valve overlap period in the predetermined low engine speed region.

Furthermore, it is preferable that the control means effects the inertial supercharging arrangement to further generate an inertia supercharging effect in a relatively high engine speed region when the variable valve timing means widens the valve overlap period.

Furthermore, it is preferable that the inertia supercharging arrangement comprises a communication passage for communicating a first intake passage communicating with a first group of cylinders and a second intake passage communicating with a second group of cylinders, the cylinders belonging to the same group being not contiguous with each other in their intake orders, and a valve for opening and closing the communication passage.

The above and other objects, features and advantages of the present invention will become more apparent from the following detailed description which is to be read in conjunction with the accompanying drawings.

DETAILED DESCRIPTION OF THE PREFERRED EMBODIMENTS

Hereinafter, preferred embodiment of the present invention will be explained in detail with reference to accompanying drawings.

Figure 1:
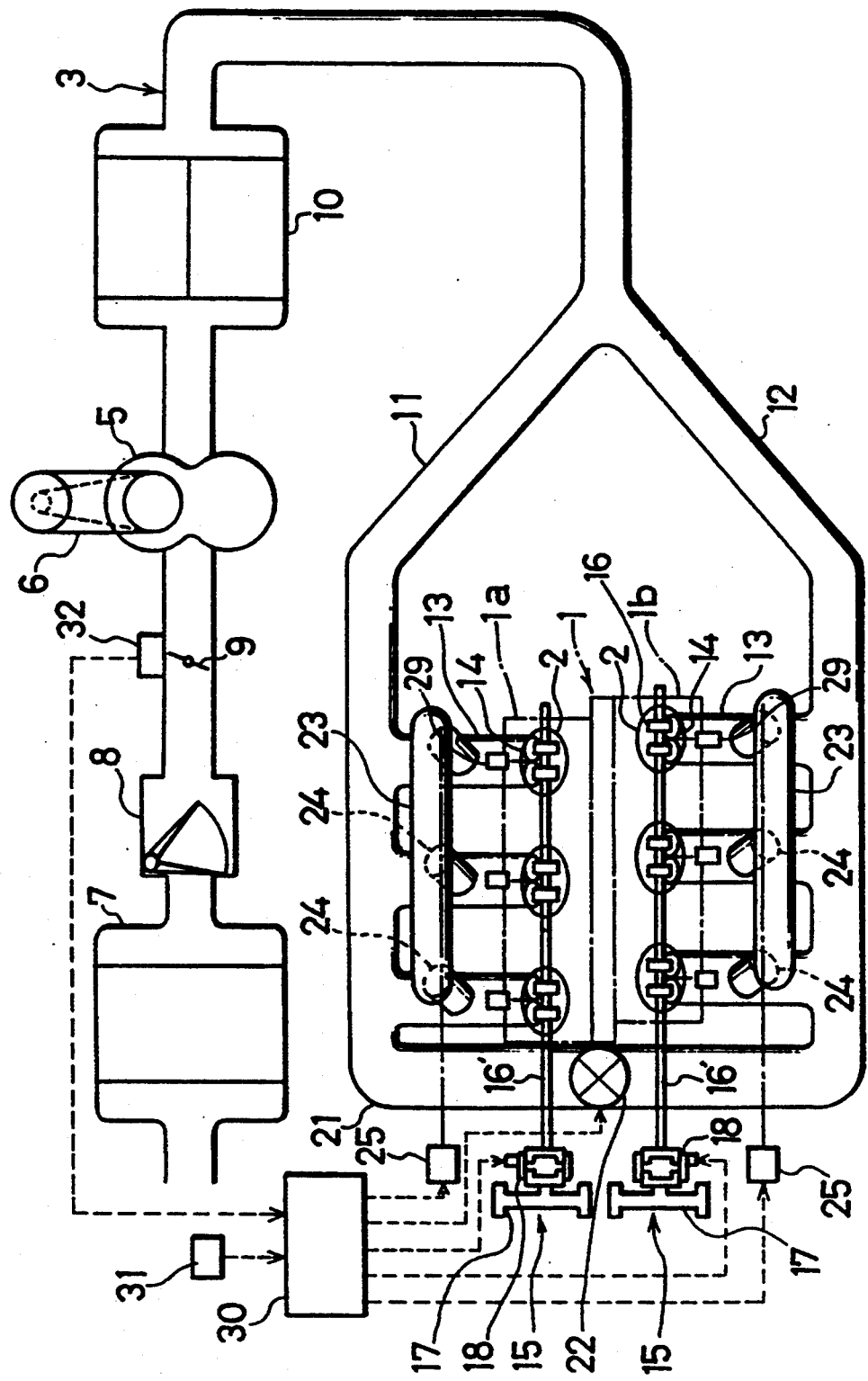
FIG. 1 is a schematic view showing an engine intake apparatus in accordance with the present invention.
Figure 7:
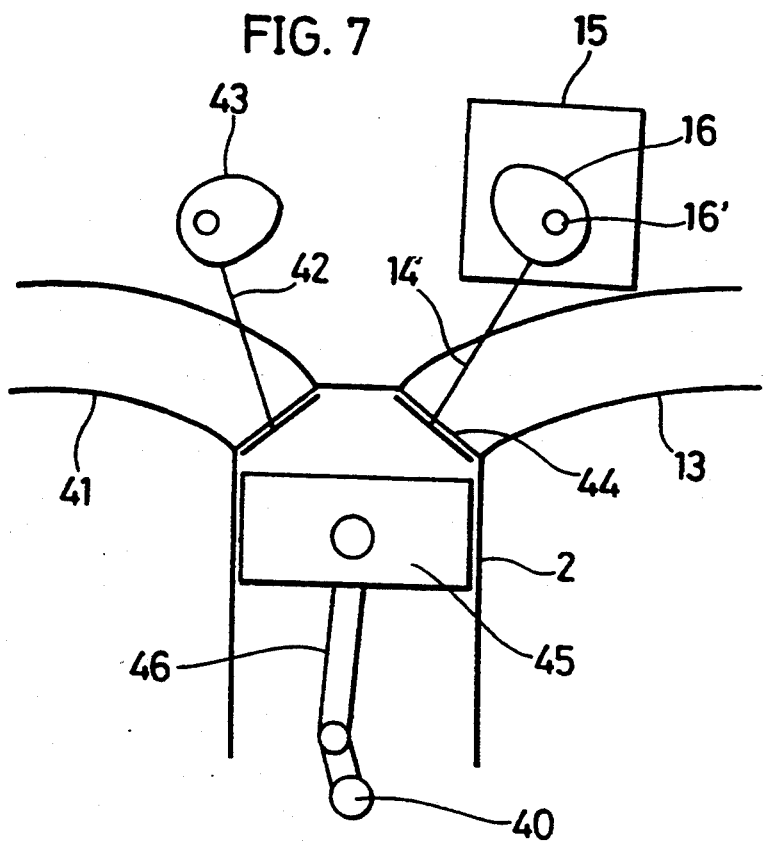
FIG. 7 is a schematic view showing an engine cylinder and its peripheral components.

FIG. 1 shows a supercharging apparatus for an internal combustion engine in accordance with the present invention. FIG. 7 shows an engine cylinder and its vicinity. In the drawings, a reference numeral 1 represents an engine accommodating a plurality of cylinders 2 therein. More specifically, the engine 1 includes a pair of banks 1a and 1b which forms a V-type 6-cylinder engine. Namely, each of the banks 1a and 1b consists of three cylinders 2, 2, and 2.

An intake air passage 3 is connected with the engine 1 to supply air to the cylinders 2, 2, - -, 2 of the engine 1. There is provided a mechanical supercharger 5 at an intermediate portion of the intake air passage 3. This mechanical supercharger 5 is entrained with an output shaft 40 of the engine by means of an appropriate transmission mechanism such as a belt 6 of its equivalent, so as to cause a rotation in proportion to an engine rotational speed.

An air cleaner an airflow meter 8, and a throttle valve 9 are provided upstream of the mechanical supercharger 5. Intake air, after having passed through the air cleaner 7, enters into the airflow meter 8, in which an airflow amount of the intake air is measured. The throttle valve 9 is responsively connected to an accelerator pedal through an appropriate linkage so as to directly transmit a depression amount of the accelerator pedal as an accelerator demand of an engine operator. Namely, the throttle valve 9 controls an overall intake air amount to be supplied into the cylinders 2. Provided downstream of the mechanical supercharger 5 is an intercooler 10 which cools the supercharged air fed from the mechanical supercharger 5.

The intake air passage 3 downstream of the intercooler 10 is bifurcated into a first intake air passage 11 and a second intake air passage 12. The first intake passage 11 is further separated into three independent intake passages 13, downstream thereof. These intake passages 13, are communicated with corresponding cylinders 2, of the bank 1a, respectively. In the same manner, the second intake passage 12 is separated into another three independent intake passages 13, downstream thereof. These intake passages 13, are communicated with corresponding cylinders 2, of the other bank 1b, respectively. More specifically, each of the independent intake passages 13, is communicated with the corresponding cylinder 2 through two intake valves 14. An engine exhaust passage 41 is also communicated with the cylinder 2 through the exhaust valve 42. The exhaust valve 42 is opened or closed by an associated cam 43.

There is provided an appropriate valve drive means 5 so as to change the open or close timing of each intake valve 14. This valve drive means includes a pair of variable valve timing mechanisms 15. Each variable valve timing mechanism 15 is operative to change the valve open/close timing by shifting the phase of a cam 16 of each intake valve 14. In other words, this variable valve timing mechanism 15 shifts the phase of a valve lift curve of the intake valve 14. The valve lift curve is generally defined as a relationship between an intake valve clearance from a valve sheet 44 versus a crank angle.

Shifting the valve lift curve of the intake valve is usually effective not only to vary the valve open/close timing of the intake valve itself but to vary a valve overlap between the intake and exhaust valves 14 and 42. In this embodiment, the exhaust valve 42 is stationary while the intake valve 14 is changeable in their valve open/close timings by means of the variable valve timing mechanism 15. In this case, the more the intake valve open/close timing is delayed, the smaller the overlap becomes. This condition is referred to as a first valve timing hereinafter in this embodiment. On the contrary, the valve overlap between the intake and exhaust valves 14 and 42 becomes large as the intake valve open/close timing is advanced. This condition is referred to as a second valve timing hereinafter in this embodiment. Namely, this variable valve timing mechanism 15 serves as a means for switching the valve timing of the intake valve 14 between the above-specified first and second valve timings.

There are various types of variable valve timing mechanisms. Although the present invention does not intend to limit the variable valve timing mechanism 15 into a specific type, the variable valve timing mechanism 15 of the present embodiment may include a cam shaft 16' forming plurality of cams 16, thereon for actuating associated intake valves 14, a cam pulley 17 rotating integrally together with the engine output shaft 40, and a phase shift member 18 interposed between the cam shaft 16' and cam pulley 17 so as to connect them through helical gears or the like. In response to a control signal, the phase shift member 18 operates to change a mutual phase between the cam pulley 17 and the cam shaft 16'.

The intake air passage 3 is constituted so as to bring both resonance supercharging effect in a specific low-engine speed region and inertia supercharging effect in a specific high-engine speed region.

The first and second intake air passages 11 and 12 define a resonance supercharging arrangement. Furthermore, in order to bring the resonance effect, the cylinders 2, belong to the same bank of the V-shape engine are not contiguous with each other in their intake strokes. Namely, the first intake air passage 11 is connected via independent intake passages 13, to one group of cylinders 2, whose intake strokes are not contiguous with each other. The second intake air passage 12 is connected via another independent intake passages 13, to the other group of cylinders 2, whose intake strokes are not contiguous with each other.

There is further provided a first communication passage 21 which connects downstream ends of the first and second intake air passages 11 and 12. A valve 22 is provided to open or close this communication passage 21. Still further, there is provided a pair of second communication passages 23 downstream of the first and second intake air passages 11 and 12. The second communication passage 23 connects three independent intake passages 13, of the same bank. There are provided three valves 24, inside the second communication passage 23. These valves 24, are integrally controlled by an actuator 25 so as to open or close the second communication passage 23 with respect to respective independent intake passages 13.

An intake passage portion from respective cylinders 2 to the first and second intake passages 11 and 12 via the independent intake passages 13 define a resonance supercharging arrangement. Thus, resonance effect develops at an engine speed where the resonance frequency of the above-defined resonance supercharging arrangement harmonizes with the pressure propagation caused by the intake operations of respective cylinders 2.

More specifically, the resonance supercharging arrangement causes a resonance effect at a relatively low engine speed because the effective passage length from respective cylinders 2 to the bifurcated point of the first and second intake air passages 11, 12 becomes relatively long.

If the valve 22 in the first communication passage 21 is opened, this first communication passage 21 serves as a volumetrically enlarged portion. Therefore, an intake passage portion from respective cylinders 2 to the first communication passage 21 via the independent intake passages 13 define an inertia supercharging arrangement.

More specifically, a negative-pressure wave is caused in response to suction motion of an engine piston 45 during the engine intake stroke. This negative-pressure wave propagates in the intake air passage 3 from the engine cylinder 2 via the independent intake passage 13 to the first communication passage 21 (i.e. the volumetrically enlarged portion of the intake air passage). In turn, the negative-pressure wave, reflected at this first communication passage 21, becomes a positive-pressure wave and returns to the engine cylinder 2. Thus, the inertial supercharging arrangement causes an inertia effect at a relatively high engine speed.

Moreover, if the valves 24, in the second communication passage 23 are opened, this second communication passage 23 serves as a volumetrically enlarged portion. Therefore, an intake passage portion from respective cylinders 2 to the second communication passage 23 via the independent intake passages 13 define an inertia supercharging arrangement in this case.

More specifically, a negative-pressure wave caused during the engine intake stroke propagates from the engine cylinder 2 via the independent intake passage 13 to the second communication passage 23. In turn, the negative-pressure wave, reflected at this second communication passage 23, becomes a positive-pressure wave and returns to the engine cylinder 2. Thus, this newly defined inertial supercharging arrangement causes an inertia effect at a higher engine speed region because of its shorter effective length.

There is provided an injector 29 supplying fuel to the corresponding engine cylinder 2 in each independent intake passage 13.

A reference numeral 30 represents a control unit (abbreviated as ECU) which performs various controls including a valve timing control as well as a control of causing dynamic supercharging effect. The control unit 30, which usually comprises a micro computer, receives signals from a rotational speed sensor 31 detecting an engine speed, a throttle valve opening sensor 32 detecting an opening degree of the throttle valve 9, and others. The control unit 30 generates a valve timing control signal fed to the variable valve timing mechanism 15 in response to the signals obtained from the above sensors 31, 32. Furthermore, the control unit 30 generates other control signals supplied to the valves 22 in the first communication passage 21 and the actuator 25 of the valves inside the second communication passage 23.

Figure 2:
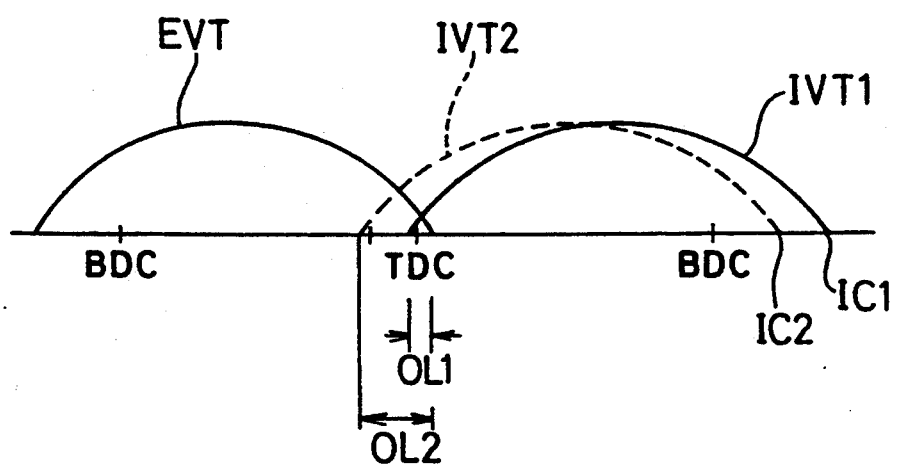
FIG. 2 illustrates valve lift curves (i.e. valve open/close timings) of intake and exhaust valves in accordance with the present invention.
Figure 3:
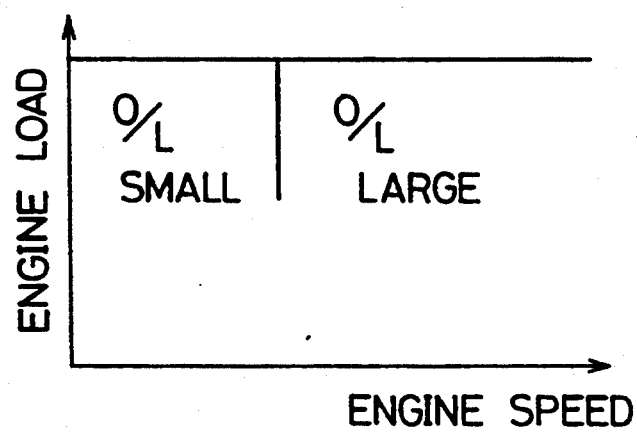
FIG. 3 is a graph showing a control map used in a control unit for controlling the variable valve timing mechanism.

FIG. 2 illustrates valve open/close timings of the intake valve 14 and the exhaust valve 42. FIG. 3 shows a control map used in the control unit 30 for controlling the variable valve timing mechanism 15. Three curves of FIG. 2 schematically depict valve lift curves of the intake/exhaust valves versus a crank angle. In FIG. 2, a valve lift curve EVT represents a stationary exhaust valve open/close timing. Two valve lift curves IVT1 and IVT2 represent intake valve open/close timings selectable by the variable valve timing mechanism 15. Namely, the valve lift curve (i.e. valve open/close timing) of the exhaust valve 42 is always fixed as the valve lift curve EVT. Meanwhile, the valve lift curve (i.e. valve open/close timing) of the intake valve 14 is switchable between the valve lift curves IVT1 and IVT2. The variable valve timing mechanism 15 operates to select either one of these valve lift curves IVT1 and IVT2.

The valve lift curve IVT1 is distinctive in that the intake valve 14 closes at a relatively delayed crank angle IC1 and a valve overlap OL1 between the intake and exhaust valves 14, 42 is relatively small. On the contrary, the valve curve IVT2 is distinctive in that the intake valve 14 closes at a relatively advanced crank angle IC2 and the overlap OL2 between the intake and exhaust valves 14, 42 is relatively large.

In the drawing, a point TDC denotes a top dead center of the engine piston 45 and its crankshaft arm 46 when at the top or outer end of its stroke. A point BDC denotes a bottom dead center of the engine piston 45 and its crankshaft arm 46 when at the bottom or inner end of its stroke. Therefore, in any case of the valve close timings IC1 and IC2, the intake valve 14 closes at a certain crank angle after BDC. Furthermore, in any case of the valve overlaps OL1 and OL2, an amount of the overlap between the intake and exhaust valves 14, 42 is a certain positive value.

That is to say, the variable valve timing mechanism 15 changes the phase of the valve lift curve of the intake valve 14 so as to realize first and second valve timings previously defined in the foregoing description. The valve lift curve IVT1 realizes the first valve timing characterized by the delayed valve close timing IC1 of the intake valve 14 and a small overlap OL1 between the intake and exhaust valves 14, 42. In case of this first valve timing, the intake valve close timing IC1 is fairly delayed from the BDC so that an effective compression ratio of the cylinder 2 becomes small compared with an expansion ratio of the cylinder 2. This is advantageous in that a pumping loss is decreased in its intake stroke and an exhaust gas temperature is favorably cooled down in its expansion stroke. The effective compression ratio is generally defined as a ratio of a cylinder volume at the TDC versus a cylinder volume at the intake valve close timing. Meanwhile, the expansion ratio is generally defined as a ratio of the cylinder volume at the TDC versus a cylinder volume at the exhaust valve open timing.

In case of the second valve timing, the overlap OL2 between the intake and exhaust valves 14, 42 is fairly large. This results in that exhaust gas is satisfactorily scavenged from the combustion chamber by a high pressure of supercharged air introduced into the combustion chamber during this long overlap period OL2. This is preferable to prevent intake air from being adversely heated by the residual exhaust gas. As is well known in the field of the engine technologies, increasing the temperature of an intake air usually induces a knocking in the succeeding compression stroke.

Specific values adopted for the engine of this embodiment are as follows: An open timing of the exhaust valve is set to BBDC 50° CA, where BBDC stands for "before bottom dead center". A close timing of the exhaust valve is set to ATDC 10° CA, where ATDC stands for "after top dead center". According to the first valve timing IVT1, an open timing of the intake valve 14 is set to BTDC 4° CA, where BTDC stands for "before top dead center". A close timing of the intake valve 14 is set to ABDC 66° CA, where ABDC stands for "after bottom dead center". According to the second valve timing IVT2, an open timing of the intake valve is set to BTDC 34° CA and a close timing of the intake valve 14 is set to ABDC 36° CA. Hence, the overlap OL1 according to the first valve timing becomes 14° CA and the overlap OL2 according to the second valve timing becomes 44° CA.

As shown in FIG. 3, the control unit 30 designates a preferable valve timing for the variable valve timing mechanism 15 in accordance with the engine operational condition. The first valve timing IVT1, i.e. a narrow valve overlap, is set in a predetermined low engine speed region. On the other hand, the second valve timing IVT2, i.e. a wide valve overlap, is set in a predetermined high engine speed region.

Figure 4:
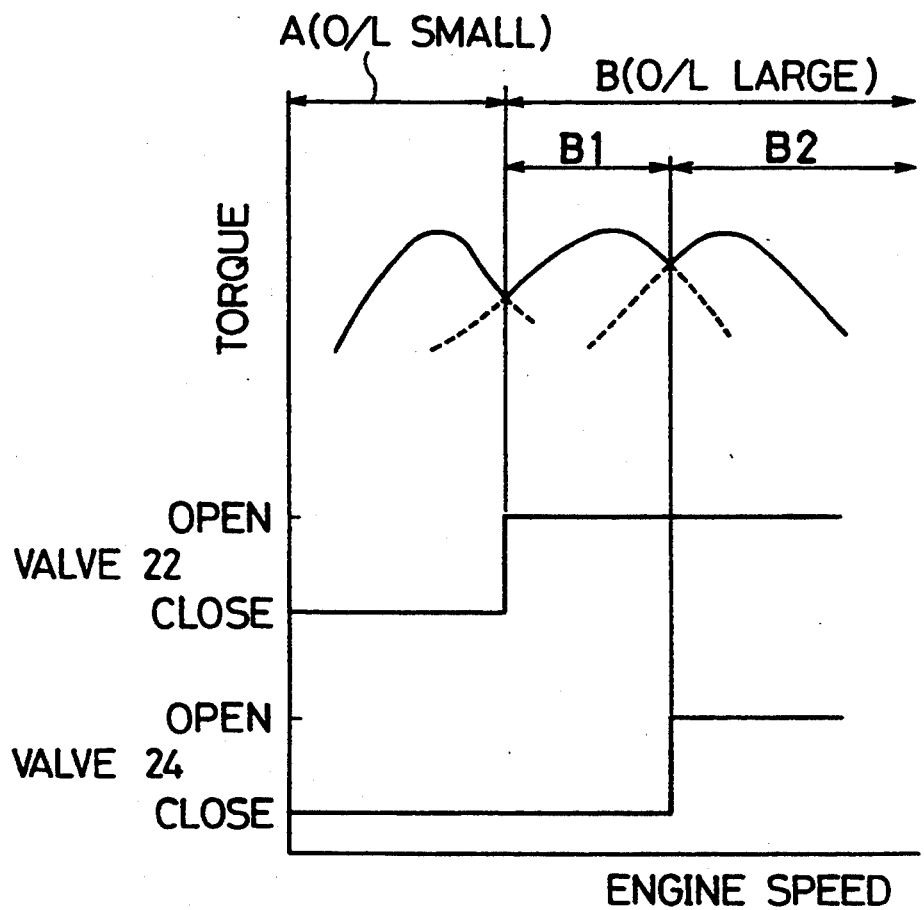
FIG. 4 is a graph showing control characteristics of various valve for causing a dynamic supercharging effect.

FIG. 4 shows the control characteristics of previously explained valves 22 and 24 for causing dynamic supercharging effect. Illustrated together in FIG. 4 is an output torque expected.

The control unit 30 basically divides the control region into several (e.g. three) regions in accordance with the engine speed and specifies these regions as A, B1 and B2 engine speed regions. The engine speed region A is the lowest engine speed region. In this engine speed region A, the valve overlap is assigned to the first valve timing IVT1, i.e. a narrow overlap. In the engine speed region A, all the valves 22 and 24 are closed. Thus, resonance supercharging effect is obtained. A peak torque is obtained at a certain resonance frequency of the resonance supercharging arrangement defined by the effective length of the first and second intake air passages 11, 12 and independent intake passages 13. The engine speed regions B1 and B2 are middle and higher engine speed regions. In these engine speed regions B1 and B2, the valve overlap is assigned to the second valve timing IVT2, i.e. a wide overlap. In the engine speed region B1, the valve 22 in the first communication passage 21 is opened. In the engine speed region B2, the valves 24 in the second communication passage 23 are opened. In respective engine speed regions B1 and B2, a peak torque is obtained at a certain characteristic frequency of the inertia supercharging intake system defined by the variation of open/close of the valves 22 and 24.

In accordance with the arrangement of the present invention, the first valve timing IVT1 is selected in the low engine speed region. Thus, the valve overlap between the intake and exhaust valves becomes small and the intake valve closes late. Reducing the overlap prevents a mixture of fresh air and fuel from passing through the combustion chamber without being burnt. This results in improvement of fuel consumption and emission in the low engine speed region.

In general, a smaller overlap tends to cause a knocking due to worse scavenging efficiency. This disadvantage is, however, automatically canceled by the reduction of the effective compression ratio because the valve close timing IC1 of the intake valve is inherently delayed according to the first valve timing IVT1. Meanwhile, the reduction of effective compression ratio is compensated by resonance supercharging so as to satisfactorily compress air-fuel mixture. Although air temperature increases to a certain extent through pressurization in the mechanical supercharger 5, the intercooler 10 disposed downstream thereof cools down the heated air. Thus, the temperature increase of the air-fuel mixture can be adequately suppressed so as to cause no knocking during the compression stroke.

On the other hand, the second valve timing IVT2 is selected in the high engine speed region. Thus, the overlap between the intake and exhaust valves becomes large. In the condition where the mechanical supercharger 5 is operative, an intake air pressure is generally higher than an exhaust gas pressure. The longer the overlap is, the more the residual exhaust gas is scavenged from the combustion chamber. This promotion of scavenging exhaust gas is effective to cool down the combustion chamber because high-temperature exhaust gas is satisfactorily removed from the combustion chamber. Furthermore, intake air is prevented from being heated through heat-exchange between the high-temperature exhaust gas and the intake air. As a result, a knocking in the compression stroke is effectively prevented.

Still further, a charging amount of an intake air increased as the residual exhaust gas is reduced. Also, advancing the close timing of the intake valve is advantageous in increasing volumetric efficiency.

In this manner, the present invention makes it possible to generate resonance supercharging effect in the low engine speed region A and the inertia supercharging effect in the higher engine speed regions B1, B2. Thus, these dynamic supercharging effects will assist the mechanical supercharger 5 in a wide engine speed range so as to increase intake air charging amount without causing knocking.

It noted that the resonance supercharging effect is utilized in the low engine speed region A wherein the valve over lap is narrowed. On the other hand, the inertia supercharging effect is utilized in the high engine speed region B (B1+B2) wherein the valve overlap is widened. This arrangement enables adequate adjustment of the scavenging performance. Also, the intake air passage can be formed to be compact.

Figure 5:
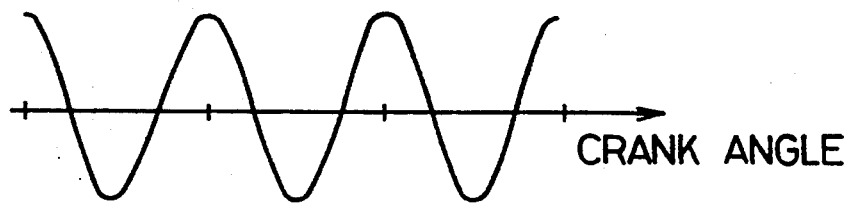
FIG. 5 is a view showing a pressure wave caused by a resonance supercharging effect.

Namely, under the condition where the valves 22 and 24 are all closed, the resonance supercharging arrangement is constituted in the intake air passage 3. In the resonance supercharging arrangement, the pressure wave is stationarily formed in the intake air passage 3 as shown in FIG. 5. This pressure wave of a sine curve in FIG. 5 is generated in the following manner.

The cylinders belonging to the same group, i.e. cylinders 2 of the bank 1a or another cylinders 2 of the other bank 1b, are cooperative to cause a stable pressure oscillation in the intake air passage 3 due to cyclically repeated intake motions of respective cylinders 2.

In this case, a relatively, large positive-pressure is generated during the valve overlap period of each cylinder because of a resonance wave stably residing in the intake air passage 3.

Figure 6A:
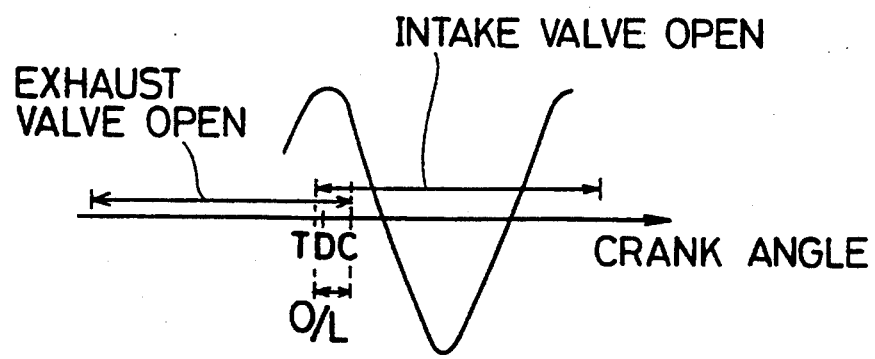
FIG. 6A is a view showing a pressure wave generated by resonance supercharging effect in a transition period from the exhaust stroke to the intake stroke.

As shown in FIG. 6A, the intake air pressure becomes high in the valve overlap period as well as the intake valve close timing.

In accordance with the present invention, the valve overlap is narrowed when the resonance supercharging arrangement is effected. Therefore, the present invention adequately adjusts the supercharged air amount introduced in the combustion chamber by narrowing the overlap period. Thus the present invention makes it possible to adequately increasing scavenging performance in the low engine speed region while preventing a mixture of fresh air and fuel from passing through the combustion chamber without being burned.

If an inertia supercharging effect is required in the low engine speed region, the independent intake passage 13 must be elongated. Accordingly, it will be impossible to make an intake air passage structure compact. However, the intake system that the present invention requires in the low engine speed region is the resonance supercharging arrangement, which can be realized by adjusting the length of the bifurcated first and second intake air passages 11 and 12. Therefore, the independent intake passages 13, can be made short. Hence, the compact intake system will be realized.

Figure 6B:
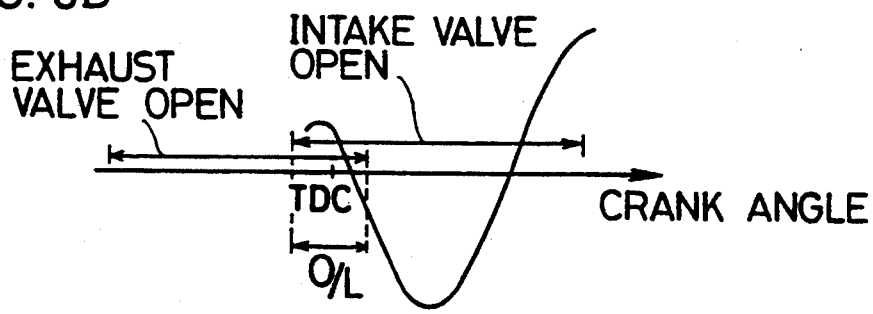
FIG. 6B is a view showing a pressure wave generated by inertia supercharging effect in a transition period from the exhaust stroke to the intake stroke.

Meanwhile, in the engine speed region B1 wherein the valve 22 is opened in the communication passage 21, the inertia supercharging arrangement is constituted. In this case, a relatively small positive-pressure is generated during the valve overlap period of each cylinder because substantially no negative pressure is yet generated in the very beginning of the intake stroke. The negative pressure is soon generated by the suction motion of the engine piston after this overlap period as shown in FIG. 6B.

The present invention widens the overlap period in view of this low intake air pressure in the relatively high engine speed region B so as to adequately increasing scavenging performance in the predetermined high engine speed region while preventing a mixture of fresh air and fuel from passing through the combustion chamber without being burned.

Although the above-described embodiment is based on an engine equipped with a mechanical supercharger 5, it is needless to say that the present invention can be applied to any other type of engine such as an engine equipped with a turbocharger or a normal aspiration engine.

Furthermore, it will be also preferable to constitute the variable valve timing mechanism 15 to vary the valve timing of the exhaust valve 42 instead of the intake valve 14.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence

What is claimed is:

1. An engine intake apparatus for use with an engine including a first group of a plurality of cylinders and a second group of a plurality of cylinders, the plurality of cylinders belonging to the same group being not contiguous with each other in their intake orders, each cylinder being provided with an intake valve and an exhaust valve, the engine intake apparatus comprising:

a valve timing change mechanism for changing open/close timings of each of the intake and exhaust valves;

valve timing control means for causing the valve timing change mechanism to widen the valve overlap period between the intake valve and the exhaust valve in a first engine speed region while to narrow the valve overlap period in a second engine speed region;

an intake air supply passage through which intake air is supplied to the two groups of cylinders, said intake air supply passage including:

an inertia supercharging arrangement having an intake air passage, one end of which is connected to one of the cylinders and the other end of which is formed with a volumetrically enlarged portion, and adapted for inverting a negative-pressure wave caused during an intake stroke of the cylinder to a positive-pressure wave to the cylinder when the engine speed is in a lower speed portion of the first engine speed region where the valve overlap period is widened; and a resonance supercharging arrangement having a first collective passage communicating with the respective intake air passages of the first group of cylinders and a second collective passage communicating with the respective intake air passages of the second group of cylinders, the first and second collective passages communicating with each other, and adapted for developing pressure oscillation of each group of cylinders to a positive resonance wave to the cylinder when the engine speed is in the second engine speed region where the valve overlap period is narrowed.

2. An engine intake apparatus in accordance with claim 1, wherein the first engine speed region has higher speeds than a predetermined speed while the second engine speed region has lower speeds than the predetermined speed.

3. An engine intake apparatus in accordance with claim 1, wherein the valve timing change mechanism includes phase shifting means for shifting the phase of a lift curve of the intake valve to vary the overlap period.

4. An engine intake apparatus in accordance with claim 3, wherein the period between open/close timings of the intake valve is set at such a period that when the lift curve phase of the intake valve is shifted in a direction to narrow the overlap period, the close timing of the intake valve delays for such a time so as to reduce the effective compression ratio of the cylinder.

5. An engine intake apparatus in accordance with claim 1, wherein the inertia supercharging arrangement is further operable when the engine speed is in a higher speed portion of the first engine speed region.

6. An engine intake apparatus in accordance with claim 6, wherein the resonance supercharging arrangement includes a valve for opening and closing the communication between the first and second collective passages.

7. An engine intake apparatus in accordance with claim 1, further comprising a mechanical supercharger connected to the intake air supply passage.

8. An engine intake apparatus in accordance with claim 7, wherein the first engine speed region has higher speeds than a predetermined speed while the second engine speed region has lower speeds than the predetermined speed.

9. An engine intake apparatus in accordance with claim 7, wherein the valve timing change mechanism includes phase shifting means for shifting the phase of a lift curve of the intake valve to vary the overlap period.

10. An engine intake apparatus in accordance with claim 9, wherein the period between open/close timings of the intake valve is set at such a period that when the lift curve phase of the intake valve is shifted in a direction to narrow the overlap period, the close timing of the intake valve delays for such a time so as to reduce the effective compression ratio of the cylinder.

11. An engine intake apparatus in accordance with claim 7, wherein the inertia supercharging arrangement is further operable when the engine speed is in a higher speed portion of the first engine speed region.

12. An engine intake apparatus in accordance with claim 11, wherein the resonance supercharging arrangement includes a valve for opening and closing the communication between the first and second collective passages.

* * * * *